United States Patent [19]

McCabe et al.

[11] 3,881,070

[45] Apr. 29, 1975

[54] TRAIN PULSE GENERATOR

[75] Inventors: Edward J. McCabe; Donald E. Westphal, both of Wellsboro, Pa.

[73] Assignee: Mel-Tronix Laboratories Corporation, Mansfield, Pa.

[22] Filed: Mar. 1, 1973

[21] Appl. No.: 337,190

[52] U.S. Cl. .................................... 179/90 K
[51] Int. Cl. .................................... H04m 1/30
[58] Field of Search ............................ 179/90

[56] References Cited

UNITED STATES PATENTS

| | | | |
|---|---|---|---|
| 3,588,362 | 6/1971 | Kass | 179/90 BD |
| 3,601,552 | 8/1971 | Barnaby et al. | 179/90 B |
| 3,718,771 | 2/1973 | Bank | 179/90 B |
| 3,732,439 | 5/1973 | Calvin | 179/90 R |
| 3,761,640 | 9/1973 | Monin | 179/90 R |
| 3,787,639 | 1/1974 | Battrick | 179/90 K |

*Primary Examiner*—Kathleen H. Claffy
*Assistant Examiner*—Gerald L. Brigance
*Attorney, Agent, or Firm*—Anthony A. O'Brien

[57] ABSTRACT

A train pulse generator has a memory for receiving and storing binary coded numbers generated by the operation of one of a plurality of push button switches in accordance with selected numbers. Write addressing facilities, activated by the operation of any of the push button switches, address the binary coded numbers to sequential discrete locations in the memory. Read addressing facilities sequentially apply the stored binary coded numbers in complementary form to a binary counter to activate a pulse generating oscillator which produces a train of pulses added to the counter until the counter is full. Delay facilities operate the read addressing facilities to apply another stored number in complementary form to the counting circuit.

9 Claims, 1 Drawing Figure

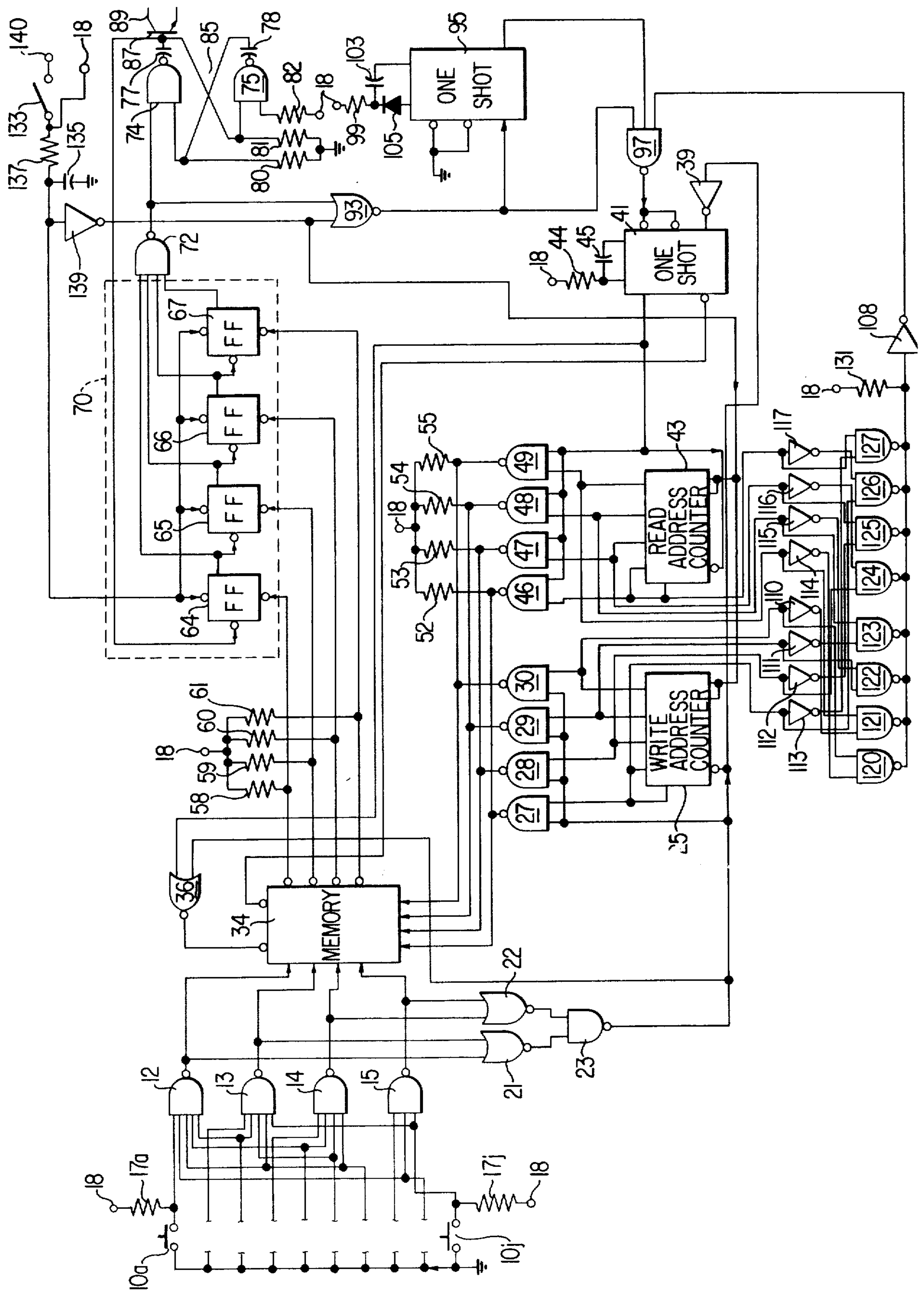
ONE SHOT
ONE SHOT
F F
F F
F F
F F
READ ADDRESS COUNTER
WRITE ADDRESS COUNTER
MEMORY

TRAIN PULSE GENERATOR

BACKGROUND OF THE INVENTION

1. Field of the Invention

The invention relates to serial pulse generators, and in particular, to a generator for producing a plurality of sequential trains of pulses corresponding to sequentially operated push button switches in accordance with desired numbers, such as a push button telephone dial pulse generator.

2. Description of the Prior Art

Examples of prior art serial pulse generators are described in U.S. Pat. Nos. 3,456,085; 3,488,450; 3,601,552; and 3,614,331. Some of the prior art generators do not allow an operator to select another number until after all the pulses have been transmitted corresponding to the previously selected number. Other prior art serial pulse generators utilize complicated and expensive circuitry for generating trains of pulses.

SUMMARY OF THE INVENTION

In accordance with the invention a pulsing apparatus for generating a plurality of trains of pulses corresponding to selected numbers includes a plurality of switches which may be selectively and sequentially operated in accordance with the selected numbers, memory means having discrete locations for storing representations of numbers therein, write addressing means operated when any of the plurality of switches is operated for addressing the memory means to store representations of the respective selected numbers in sequential discrete locations of the memory means, a counter, read addressing means for sequentially applying representations of numbers from the sequential discrete locations of the memory means to the counter to produce corresponding counts in the counter, oscillator means for serially generating pulses, first control means for enabling the oscillator means in response to the receipt of a representation of a number by the counter and for disabling the oscillator means after a train of pulses corresponding to the count in the counter have been generated, and second control means responsive to the first control means disabling the oscillating means for operating the read addressing means to apply a representation of a number from the memory means to the counter.

Additionally, facilities operated by the switches generate binary coded numbers which are applied in complementary form to a binary counter which is advanced by pulses from oscillating means until the count in the counter reaches a predetermined count to disable the oscillating means.

Also, delay facilities respond to the disabling of the oscillating means to advance the read addressing means after a predetermination duration between successive trains of pulses.

Further, the delay facilities are disabled by coincidence facilities sensing a coincidence of the write addressing means with the read addressing means to prevent generation of pulses until a new number has been stored in the memory means.

One advantage of the invention is that succeeding numbers or digits may be selected by an operator without waiting for the completion of the production of pulses corresponding to previously selected numbers.

Other features and advantages of the present invention will become apparent from the following description of the preferred embodiments taken in conjunction with the accompanying drawings.

BRIEF DESCRIPTION OF THE DRAWING

The drawing is a diagram of an apparatus for a generating trains of pulses in accordance with the invention.

DESCRIPTION OF THE PREFERRED EMBODIMENT

As illustrated in the drawing, a telephone dial pulse generator includes push button switches 10*a*–10*j* (10*b*–10*i* not shown) which may be selectively and sequentially operated in accordance with selected numbers or digits to be dialed or pulsed in a telephone network. The switches 10*a*–10*j* are connected to respective inputs of nand gates 12–15 to selectively ground the inputs which are normally biased positive by resistors 17*a*–17*j* (17*b*–17*i* not shown) connected to a voltage terminal 18. Outputs of the nand gates 12–15, producing signals representing binary coded numbers corresponding to the selected numbers, are connected to respective inputs of a memory 34 and to respective inputs of nor gates 21 and 22 which have outputs connected to inputs of a nand gate 23 which produces a write signal whenever any of the push button switches 10*a*–10*j* are operated. The output of the nand gate 23 is connected to an input of a write address counter 25 to advance the count of the counter 25 which has outputs connected to respective first inputs of nand gates 27–30 gated by write signals from the nand gate 23 connected to second inputs of the nand gates 27–30 to apply sequential address signals on address inputs of the memory 34 connected to outputs of respective nand gates 27–30. Also, the output of the nand gate 23 is connected by a nor gate 36 to a memory enable input of the memory 34 to enable the memory 34 to store successive binary coded numbers from the nand gates 12–15 in sequential locations of the memory 34 selected by the address signals from the nand gates 27–30.

The output of the nand gate 23 is connected by an inverter 39 to a one shot 41 which has a first output connected to an input of a read address counter 43 to enable the advancement of the read address counter 43 after the end of the write signal from the nand gate 23. A resistor 44 connected to the terminal 18 and a capacitor 45 form part of the circuitry of the one shot 41 which produces a read signal for a suitable short duration. The outputs of the read address counter 43 are connected by nand gates 46–49, gated by the read signal on the first output of the one shot 41 connected to inputs of the gates 46–49, to the address inputs of the memory 34. The first output of the one shot 41 is connected to an input of the nor gate 36 and a second output of the one shot 41 is connected to a write enable input of the memory 34 to produce signals on outputs of the memory representing the one's complement, or the inverse, of the binary coded number stored in the memory location selected by the address signals on the outputs of the nand gates 46–49 during a read signal from the one shot 41.

The memory circuit 34 is a read write memory, such as the single unit integrated circuit model number MCM4064 sold by Motorola, Inc. and model number SN 7489 sold by Texas Instruments, Inc. Resistors 52–55 connected to the voltage terminal 18 provide bias for the address inputs of the memory 34 while resistors 58–61 connected to the terminal 18 provide bias to the outputs of the memory 34.

The outputs of the memory 34 are connected to inputs of respective flip flops 64–67 interconnected as a binary counter 70. Outputs of the flip flops 64–67 are connected to respective inputs of a nand gate 72 which has an output connected to an input of a nand gate 74 interconnected with a nand gate 75 by capacitors 77 and 78, resistors 80 and 81 to ground and resistor 82 to the terminal 18 as an astable multivibrator or oscillator 85. The capacitor 77 also connects the output of the nand gate 74 to the base of a transistor switch 87 connected in series with a telephone line 89 to generate dialing pulses on the telephone line when the oscillator 85 is not disabled by a disable signal from the nand gate 72. The output pulses from capacitor 77 which is connected to an input of the flip flop 64 advance the count of the counter 70 until all the flip flops 64–67 produce signals indicating the counter 70 is full to operate the nand gate 72 and disable the oscillator 85.

The resistors 80–82 and the capacitors 77 and 78 are selected to cause the oscillator 85 to produce pulses of a frequency and duration acceptable to a telephone switching network. While the oscillator 85 is shown as a conventional astable multivibrator, any oscillator which generates suitable pulses may be employed.

The output of the nand gate 72 is also connected through a nor gate 93 to a one shot circuit 95 and a first input of a nand gate 97. The one shot 95, including a resistor 99 connected to the terminal 18, a capacitor 103 and a diode 105, has a output connected to a second input of the nand gate 97 to disable the nand gate 97 for a predetermined duration corresponding to the desired delay between successive trains of pulses produced on the line 89. A third input to the nand gate 97 is connected by an inverter 108 to a coincidence circuit containing inverters 110–117 and nand gates 120–127. The outputs of the write address counter 25 are connected to first inputs of the respective nand gates 120, 122, 124 and 126; and the outputs of the read address counter 43 are connected to first inputs of the respective nand gates 121, 123, 125 and 127 while the inverters 110–113 connect the outputs of the write address counter 25 to second inputs of the respective nand gates 121, 123, 125 and 127 and the inverters 114–117 connect the outputs of the read address counter 43 to second inputs of the respective nand gates 120, 122, 124 and 126 to produce a coincidence signal on a common output biased by a resistor 131 connected to the terminal 18 only if the count in the write address counter 25 is the same as the count in the read address counter 43 to disable the nand gate 97. The nand gate 97 is connected to inputs of the one shot 41 to operate the one shot 41 when both the nand gate 97 and the one shot 41 are enabled to produce a read signal.

A conventional hook switch 133 is provided for disconnecting the terminal 18 from a voltage source 140 when a handheld telephone receive (not shown) is positioned on a telephone instrument (not shown) when not being used. The switch 133 is closed by lifting the handheld receiver to connect the voltage source 140 to the terminal 18 and to a series resistor 137 and capacitor 135 connected to ground to charge the capacitor 135 after a delay of from 2 to 7 milliseconds. During the delay the low voltage level across the capacitor 135 connected to set inputs of flip flops 64–67 presets the counter 70 to the full count. The capacitor 135 is connected by inverter 139 to reset inputs of the write address counter 25 and the read address counter 43 to reset the counters 25 and 43 to their zero counts. Also the inverter is connected to a second input of the nor gate 93 to cause a delay in the reading of any numbers from the memory 34 for at least a predetermined duration after the hook switch 133 has been closed.

The drawing illustrates circuitry by various symbols or blocks designed to perform various functions. Preferably most of the circuitry is made from conventional integrated circuit units selected to perform one or more of the functions illustrated to produce a reliable and inexpensive dialing pulse generator which may be included within a telephone instrument or the like.

To initiate operation of the train pulse generator the handheld receiver is lifted to close the hook switch 133 and connect the voltage source 140 to the terminal 18 to activate the circuit. The initial low voltage on the capacitor 135 sets the flip flops 64–67 of the counter 70 to the full count and through the inverter 139 resets the write address counter 25 and the read address counter 43 to their zero counts. Also during the charging of the capacitor 135 the one shot 95 is operated to produce a delay signal to prevent the one shot 41 from producing a read signal for a predetermined duration.

To select a first desired number or digit, the operator presses one of the push button switches **10*a*–10*j* to produce a corresponding binary coded number on the outputs of the nand gates 12–15 which produces a write signal on the output of nand gate 23 to advance the write address counter 25 and produce address signals on the outputs of nand gates 27–30 corresponding to a first memory location in the memory 34. Also the write signal is applied by the nor gate 36 to the enable input of the memory 34 to write and store the binary coded number on the output of the nand gates 12–15 into the first location in the memory 34. Selection of succeeding numbers by selective and sequential operation of the push button switches 10*a*–10*j* stores corresponding binary coded numbers in succeedingly addressed locations in the memory 34**.

After the termination of the first write signal from the output of the nand gate 23 and after the delay signal from the one shot 95, the one shot 41 operates to produce a read signal to advance the read address counter 43 to produce address signals of the first memory location which are applied to the memory 34. Also read signals from the one shot 41 are applied to the write enable input and the memory enable inputs of the memory 34 to cause the memory 34 to apply the one's complement of the first binary coded number stored in the memory 34 to the flip flops 64–67 of the counter 70. When the one's complement of the first binary coded number is placed as a count in the counter 70, the nand gate 72 enables the oscillator 85 to begin producing pulses on the telephone line 89. Each successive pulse produced by the oscillator 85 is added to the count in the counter 70 until the counter 70 reaches a full count and the nand gate 72 produces a disable signal to disable the oscillator 85.

The disable signal from the nand gate 72 enables the first input of the nand gate 97 and triggers the one shot 95 again to produce the delay signal and disable the second input of the nand gate 97 which may have its third input disabled by a coincidence signal from the nand gates 120–127 if the count of the write address counter 25 is the same as the count of the read address counter 43 indicating that a second number has not been selected by the operator. When the nand gate 97 is again enabled and there is an absence of a read signal from the nand gate 23, the one shot 41 operates to again produce the read signal to cause the application of the one's complement of the binary coded number stored in the second location in the memory 34 to the counter 70 to produce the train of pulses on the telephone line 89 corresponding to the second selected number. In a similar manner further succeeding selected numbers are pulsed.

While the train pulse generator has been described as dial pulse generator for a telephone system, the train pulse generator may be readily employed in any other system which utilizes variable trains of pulses corresponding to selected characters or numbers.

Since many variations, modifications, and changes in detail may be made to the embodiment described in the foregoing description or shown in the drawing, it is intended that all matter contained in the foregoing description or shown in the accompanying drawing shall be interpreted as illustrative and not in a limiting sense.

What is claimed is:

1. A pulsing apparatus for generating a plurality of trains of pulses on a telephone line corresponding to selected numbers comprising
- a plurality of switches which may be selectively and sequentially operated in accordance with the selected numbers,
- memory means for receiving and storing representations of a plurality of numbers therein,
- means, responsive to operation of any of the plurality of switches, for operating the memory means to store representations of the respective selected numbers in the memory means,
- a counter,
- means for applying representations of the stored representations, in the same order as stored in the memory means, from the memory means to the counter to produce corresponding sequential counts in the counter,
- an oscillator including first and second gate means interconnected to form an astable multivibrator,
- means directly responsive to one of the first and second gate means for pulsing the telephone line,
- first control means connected to an input of one of the first and second gate means for enabling the oscillator in response to the application of a representation of each stored representation to the counter and for disabling the oscillator after a train of pulses on the telephone line corresponding to each count in the counter have been generated,
- second control means, responsive to the first control means disabling the oscillator, for operating the applying means to apply a representation of a stored representation from the memory means to the counter, and
- delay means for preventing the operation of the oscillator for a predetermined duration between successive trains of pulses.

2. A pulsing apparatus as defined in claim 1 wherein the delay means includes a one shot and third gate means connected between the first and second control means for delaying the operation of the second control means for the predetermined duration after the disabling of the oscillator,
- said one shot being triggered by the first control means and having an output connected to the third gate means for disabling the third gate means for the predetermined duration.

3. A pulsing apparatus as defined in claim 1 which includes
- means for preventing operation of the second control means when the last representation applied by the applying means to the counter from the means is the last stored representation in the memory means.

4. A pulsing apparatus as defined in claim 1 wherein there is included coding means for generating respective binary coded representations of the selected numbers in response to the selective operation of the plurality of switches,
- the memory means includes means for storing binary coded representations of numbers, and
- the counter includes binary counting means for receiving binary coded representations of numbers to produce a corresponding binary count in the counter.

5. A pulsing apparatus as defined in claim 4 wherein the first control means includes
- means for applying pulses from the oscillator to the counter to change the binary count of the counter, and
- means responsive to the binary count of the counter having a predetermined value for disabling the oscillator.

6. A telephone pulsing apparatus for generating a plurality of trains of pulses corresponding to selected numbers on a telephone line comprising
- a plurality of manual switches which may be selectively and sequentially operated in accordance with the selected numbers,
- binary coding means connecting the plurality of manual switches for producing binary coded numbers corresponding to the selected numbers,
- a memory having a plurality of discrete storage locations,
- first addressing means operated when any of the switches is operated for storing the binary coded numbers in sequential discrete locations in the memory,
- a binary counter,
- second addressing means for sequentially applying one's complements of the binary coded numbers from the sequential discrete locations of the memory to the counter to produce corresponding counts in the counter,
- an oscillator including first and second gate means interconnected to form an astable multivibrator,
- means directly responsive to one of the first and second gate means for pulsing the telephone line,
- means for applying pulses from the oscillator to the counter to add to the count in the counter,
- first control means connected between the counter and an input of one of the first and second gate means for applying a disable signal to the input of the latter one gate means when the count of the counter has a predetermined value to prevent the generation of pulses, delay means including a one shot triggered by the disable signal for producing a delay signal of a predetermined duration, and second control means enabled only during the presence of the disable signal and the absence of the delay signal for operating the second addressing means to apply a one's complement of a binary coded number in the memory to the counter.

7. A pulsing apparatus as defined in claim 6 which includes coincidence means, sensing a coincidence of the last discrete location in the memory in which a binary coded number has been stored by the first addressing means with (b) the last discrete location in the memory from which the second addressing means has applied a one's complement, for applying a hold signal to the second control means to prevent operation of the second control means until another binary coded number has been stored in another discrete location in the memory.

8. A telephone pulsing apparatus for generating a plurality of trains of pulses on a pair of telephone lines corresponding to selected numbers comprising a plurality of switches which may be selectively and sequentially operated in accordance with the selected numbers, memory means for receiving and storing representations of a plurality of numbers therein, means, responsive to operation of any of the plurality of switches, for operating the memory means to store representations of the respective selected numbers in the memory means, a counter, means for applying representations of the stored representations, in the same order as stored in the memory means, from the memory means to the counter to produce corresponding sequential counts in the counter, oscillator means for serially generating pulses on the pair of telephone lines, first control means for enabling the oscillator means in response to the receipt of a representation of a number by the counter and for disabling the oscillator means after a train of pulses corresponding to the count in the counter have been generated, a one shot triggered in response to the first control means disabling the oscillating means, gating means having a first input controlled by the one shot and a second input controlled by the first control means to disable the gating means when the one shot is triggered, and second control means operated by the gating means for operating the applying means when the oscillator means is disabled to apply a representation of a stored representation from the memory means to the counter.

9. A pulsing apparatus as claimed in claim 8 including switch means for resetting the counter, said switch means being connected to the one shot for triggering the one shot.

* * * * *